(12) United States Patent
Kalogerakis et al.

(10) Patent No.: US 9,146,367 B2
(45) Date of Patent: Sep. 29, 2015

(54) MODULAR DEVICE FOR AN OPTICAL COMMUNICATION MODULE

(71) Applicant: Finisar Corporation, Sunnyvale, CA (US)

(72) Inventors: Georgios Kalogerakis, Mountain View, CA (US); The'Linh Nguyen, San Jose, CA (US); Jason Miao, Sunnyvale, CA (US)

(73) Assignee: FINISAR CORPORATION, Sunnyvale, CA (US)

( * ) Notice: Subject to any disclaimer, the term of this patent is extended or adjusted under 35 U.S.C. 154(b) by 418 days.

(21) Appl. No.: 13/706,454

(22) Filed: Dec. 6, 2012

(65) Prior Publication Data

US 2013/0148984 A1  Jun. 13, 2013

Related U.S. Application Data

(60) Provisional application No. 61/567,760, filed on Dec. 7, 2011.

(51) Int. Cl.
*G02B 6/42* (2006.01)
*G02B 6/43* (2006.01)
*H04B 10/50* (2013.01)

(52) U.S. Cl.
CPC ............ *G02B 6/4246* (2013.01); *G02B 6/4249* (2013.01); *H04B 10/50* (2013.01); *G02B 6/428* (2013.01); *G02B 6/43* (2013.01); *Y10T 29/49002* (2015.01)

(58) Field of Classification Search
None
See application file for complete search history.

(56) References Cited

U.S. PATENT DOCUMENTS

| 5,005,939 | A | 4/1991 | Arvanitakis et al. |
| 5,715,339 | A | 2/1998 | Takai et al. |
| 7,329,054 | B1 | 2/2008 | Epitaux et al. |
| 2003/0072538 | A1 | 4/2003 | Jin et al. |
| 2003/0185484 | A1 | 10/2003 | Chakravorty et al. |
| 2008/0152340 | A1 | 6/2008 | Hung et al. |
| 2011/0075965 | A1 | 3/2011 | DeMeritt et al. |

FOREIGN PATENT DOCUMENTS

WO   2008-124692   10/2008

OTHER PUBLICATIONS

International Search Report and Written Opinion dated Mar. 28, 2013 as received in PCT Application No. PCT/US2012/068504.
European Search Report in European Application No. 12855327.8, dated Jul. 1, 2015, 7 pgs.

*Primary Examiner* — Jerry Rahll
(74) *Attorney, Agent, or Firm* — Maschoff Brennan

(57) ABSTRACT

A modular device for an optical communication module configured to be coupled to an optical transmission medium. The modular device may include a first edge and a second edge and N number of electrical circuit channels between the first and second edges. Each electrical circuit channel may include at least one element configured to provide functionality for communicating optical signals through the optical transmission medium. The modular device may also have a width between the first and second edges so that each of the N number of electrical circuit channels of C number of modular devices aligns with one of P number of interface channels of an opto-electrical interface configured to be coupled to the optical transmission medium when C equals P/N and C is a whole number greater than zero.

19 Claims, 4 Drawing Sheets

MODULAR DEVICE FOR AN OPTICAL COMMUNICATION MODULE

CROSS-REFERENCE TO RELATED APPLICATIONS

This patent application claims priority to U.S. Provisional Patent Application No. 61/567,760, filed on Dec. 7, 2011, which is incorporated herein by reference in its entirety.

FIELD

The embodiments discussed herein are related to integrated circuits in an optical communication module.

BACKGROUND

Optical communication modules may be used to transmit optical signals over optical fibers. In some applications, optical fibers may be grouped to form optical fiber ribbon cables. Optical fiber ribbon cables may be used to transmit multiple optical signals in parallel. Transmitting multiple optical signals in parallel may increase data transfer rates between systems. Alternately or additionally, transmitting multiple optical signals in parallel may also provide a way for multiple dedicated communication channels to be established between components within the same or different systems.

As data transfer rates increase, dedicated communication channels become more standard, among other things, the number of optical fibers within optical fiber ribbon cables may also increase. Correspondingly, designs for optical communication modules that may be used to transmit and/or receive optical signal on the optical fibers of an optical fiber ribbon cable may change. In particular, a number of ports for an optical communication module that couple to individual optical fibers in optical fiber ribbon cables may also increase. An increase in the number of ports on optical communication modules may lead to multiple different form factors and/or configurations of optical communication modules.

SUMMARY

Example embodiments generally relate to optical communication modules. More particularly, some embodiments relate to integrated circuits used in optical communication modules.

In some embodiments, a modular device for an optical communication module configured to be coupled to an optical transmission medium may be disclosed. The modular device may include a first edge and a second edge and N number of electrical circuit channels between the first and second edges. Each electrical circuit channel may include at least one element configured to provide functionality for communicating optical signals through the optical transmission medium. The modular device may also have a width between the first and second edges so that each of the N number electrical circuit channels of C number of modular devices align with one of P number of interface channels of an opto-electrical interface configured to be coupled to the optical transmission medium when C equals P/N and C is a whole number greater than zero.

In some embodiments, a method of manufacturing an optical communication module configured to be coupled to an optical transmission medium and that includes a modular device may be disclosed. The method may include forming C number of modular devices, each of the C number of modular devices including a first edge and a second edge and including N number of electrical circuit channels between the first and second edges. Each electrical circuit channel may include at least one element configured to provide functionality for communicating optical signals through the optical transmission medium. The method may also include coupling the C number of modular devices to an opto-electrical interface that includes P number of interface channels and that is configured to be coupled to the optical transmission medium. Each of the N number of electrical circuit channels of the C number of modular devices may align with one of the P number of interface channels when C equals P/N and C is a whole number greater than zero.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features and advantages of the invention will be set forth in the description that follows or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

A more particular description of the invention will be rendered by reference to embodiments thereof, which are illustrated in the appended drawings. It is appreciated that these drawings depict only some embodiments of the invention and are therefore not to be considered limiting of its scope. The invention will be described and explained with additional specificity and detail through the use of the accompanying drawings in which.

DETAILED DESCRIPTION

In some embodiments, a modular device for an optical communication module that is configured to be coupled to an optical transmission medium may be disclosed. The modular device may include a first edge and a second edge and N number of electrical circuit channels between the first and second edges. In some embodiments, N may be four. Each electrical circuit channel may include at least one element configured to provide functionality for communicating optical signals through the optical transmission medium. For example, the electrical circuit channels may be configured to provide functionality for receiving an optical signal. In these and other embodiments, the electrical circuit channel may include a transimpedance amplifier. As another example, the electrical circuit channels may be configured to provide functionality for transmitting an optical signal. In these and other embodiments, the electrical circuit channel may include a laser diode. Each of the modular devices may include a ring seal around their peripheries.

The modular device may also have a width between the first and second edges so that each of the N number electrical circuit channels of C number of modular devices align with one of P number of interface channels of an opto-electrical interface configured to be coupled to the optical transmission medium. In these and other embodiments, C may equal P/N where C is a whole number greater than zero. This configuration of a modular device allows a single modular device design to be used with an opto-electrical interface that includes N number of interface channels or any multiple of N number of interface channels. By using a single modular device design within multiple devices with varying sizes of opto-electrical interfaces, reliability may increase and/or manufacturing costs and/or research and development costs may decrease.

For example, the optical transmission medium may be an optical fiber ribbon cable with 12 optical fibers and the opto-electrical interface may include 12 interface channels that each includes an opto-electric transducer, such as a photo-diode. In these and other embodiments, 3 modular devices of a same modular device design may be aligned so that each electric circuit channel of the 3 modular devices is aligned with one of the 12 interface channels and receives an electrical signal generated by one of the opto-electric transducers of the opto-electrical interface.

Some example embodiments will now be explained with reference to the accompanying drawings.

Figure 1:
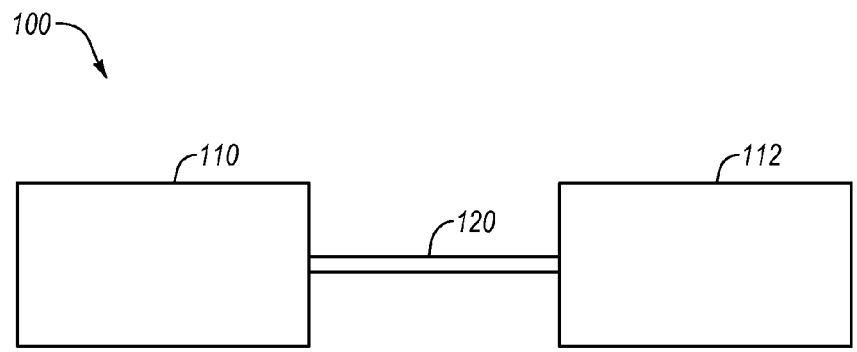
FIG. 1 illustrates an optical communication system.

FIG. 1 illustrates an optical communication system 100, arranged in accordance with at least some embodiments described herein. The optical communication system 100 may include a first optical communication module 110 and a second optical communication module 112 that may be connected by an optical transmission media 120. In some embodiments, the optical transmission media may include one or more optical fibers. For example, the optical transmission media may include an optical fiber ribbon cable. The optical communication system 100 may use the first and second optical communication modules 110, 112 to receive and transmit electrical signals, convert electrical signals to optical signals, convert optical signals to electrical signals, and receive and transmit optical signals over the optical transmission media 120. In some embodiments, the first and second optical communication modules 110, 112 may be optical transceivers of any form factor, such as XFP, SFP, SFF, SFP+, and others. In some embodiments, the first and second optical communication modules 110, 112 may be optical transponders of any form factor, such as CFP and others.

In some embodiments, the first optical communication module 110 may include transmitters and the second optical communication module 112 may include receivers. Alternately, the first optical communication module 110 may include receivers and the second optical communication module 112 may include transmitters. In some embodiments, the first and second optical communication modules 110, 112 may include either a transmitter or a receiver for each optical fiber in the optical transmission media 120. In some embodiments, the first and second optical communication modules 110, 112 may include one or more transmitters and receivers for each optical fiber in the optical transmission media 120. In some embodiments, the optical transmission media 120 may include multimode optical fibers or single mode optical fibers.

Additionally, in some embodiments, the optical communication system 100 may be a complete system that is not modular. In these embodiments, the optical communication system 100 may not be designed for the first and second optical communication modules 110, 112 to be disconnected from the optical transmission media 120. In contrast, in some embodiments, the optical communication system 100 may be formed from modular components. In these embodiments, the first and second optical communication modules 110, 112 may be designed for attachment and dis-attachment from the optical transmission media 120.

Figure 2:
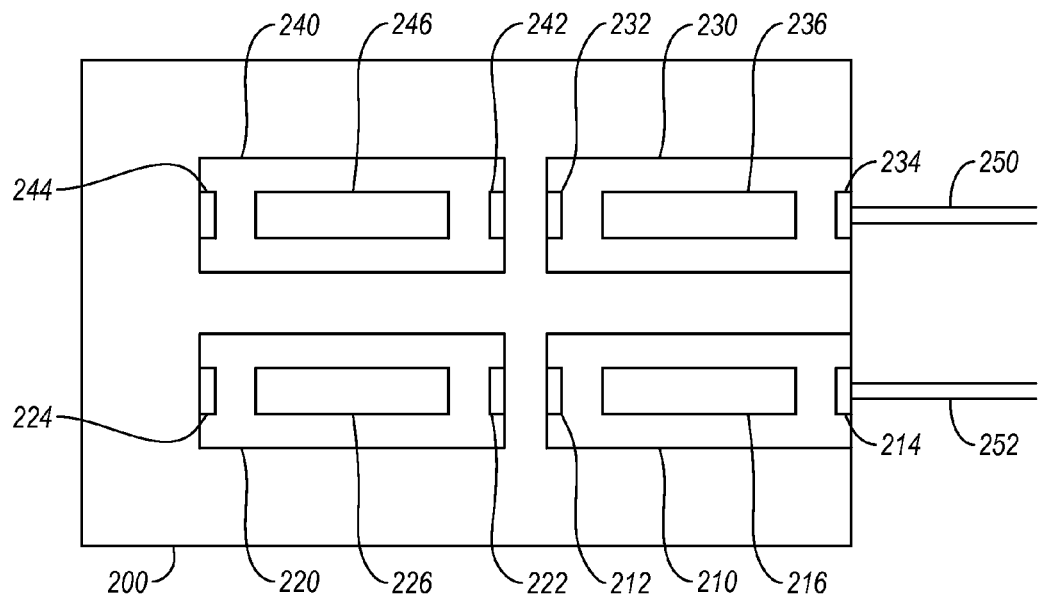
FIG. 2 illustrates a diagram of various components within an optical communication module.

FIG. 2 illustrates a diagram of various components within an optical communication module 200, arranged in accordance with at least some embodiments described herein. The optical communication module 200 may include various components, such as a receiver interface channel 210, a receiver electrical circuit channel 220, a transmitter interface channel 230, and a transmitter electrical circuit channel 240. In some embodiments, each of the channels 210, 220, 230, 240 may be a modular channel that is an individual component. Alternately or additionally, each of these channels 210, 220, 230, 240 may be a part of a single component. Alternately or additionally, the channels 210, 230 may be part of a single component and the channels 220, 240 may be part of another single component.

The receiver interface channel 210 may include a connector 212, a port 214, and a receiver 216. The port 214 may be connected to an optical fiber 252. The receiver 216 may receive optical signals from the optical fiber 252 by way of the port 214 and may act as an opto-electric transducer by transforming the optical signal into an electrical signal. In some embodiments, the receiver 216 may include a photodiode.

The receiver electrical circuit channel 220 may include a connector 222 connected to the connector 212 of the receiver interface channel 210, a lead 224, and a receiver electrical circuit 226. After the receiver 216 transforms the optical signal into an electrical signal, the receiver 216 may send the resulting electrical signal through the connectors 212, 222 to the receiver electrical circuit 226. The receiver electrical circuit 226 may condition the electrical signal and place the conditioned signal onto the lead 224 for transmitting the condition signal out of the optical communication module 200. The receiver electrical circuit 226 may condition the electrical signal by filtering, amplifying, or otherwise conditioning the signal. In some embodiments, the receiver electrical circuit 226 may include an element such as a transimpedance amplifier.

The transmitter interface channel 230 may include a connector 232, a port 234, and a transmitter 236. The port 234 may be connected to an optical fiber 250. The transmitter 236 may act as an electro-optic transducer by emitting optical signals into the optical fiber 250. In some embodiments, the transmitter 236 may include a laser, a light-emitting diode, a laser diode, a vertical cavity surface-emitting laser (VCSEL) diode, or some other optical signal-generating device.

The transmitter electrical circuit channel 240 may include a connector 242 connected to the connector 232 of the transmitter interface channel 230, a lead 244, and a transmitter electrical circuit 246. The lead 244 may receive an electrical signal from outside the optical communication module 200 that includes information that is to be transmitted through the optical fiber 250. The transmitter electrical circuit 246 may drive the transmitter 236 by way of the connectors 232, 242 with the received electrical signal causing the transmitter 236 to transmit optical signals with the information from the received electrical signal.

In some embodiments, the channels 210, 220, 230, 240 may include additional circuitry or components. For example, in some embodiments, the channels 220, 240 may include leads that connect with control circuitry within the optical communication module 200. In some embodiments, the connectors 212, 222, 232, 242 of the channels 210, 220, 230, 240, respectively, may include more than one connector to establish a connection between the channels 210, 220, 230, 240.

Furthermore, in some embodiments the optical fibers 250, 252 may be individual optical fibers. Alternately, the fibers 250, 252 may be part of an optical fiber ribbon cable. In these embodiments, the ports 214, 234 may be spaced apart according to the spacing of the optical fibers 250, 252 within the optical fiber ribbon cable.

It should be understood that the optical communication module 200 may include additional or alternate circuitry. For example, in some embodiments, the optical communication module 200 may include a multiplexer and de-multiplexer and the additional necessary hardware to allow for multiple modes of the optical fibers 250, 252 to be utilized. In some embodiments, the optical communication module 200 may include control circuitry for optimizing the performance of the receiver and transmitter electrical circuitry 226, 246. In some embodiments, the optical communication module 200 may include a transmitter interface channel, a transmitter electrical circuit channel, a receiver interface channel, and a receiver electrical circuit channel for each optical fiber connected to the optical communication module 200. In some embodiments, the optical communication module 200 may include only transmitter interface channels and transmitter electrical circuit channels for each optical fiber connected to the optical communication module 200. In some embodiments, the optical communication module 200 may include only receiver interface channels and receiver electrical circuit channels for each optical fiber connected to the optical communication module 200.

FIG. 2 illustrates an embodiment where an optical fiber ribbon cable may include two optical fibers. However, the number of optical fibers in optical fiber ribbon cables may vary. For example, an optical fiber ribbon cable may include 1, 2, 4, 8, 12, 16, or any number of optical fibers. Different optical communication modules with the appropriate number of channels may be used for each optical fiber ribbon cable with a different number of optical fibers. To reduce the number of different components involved to manufacture each different communication module, certain components or groups of components may be designed to be modular and used in multiple communication modules. For example, in some embodiments, the receiver electrical circuit channels and transmitter electrical circuit channels may be designed to be modular. In some embodiments, the receiver channels and transmitter channels may be designed to be modular. In some embodiments, the receiver and transmitter channels as well as the receiver electrical circuit and transmitter electrical circuit channels may be designed to be modular.

An example of a group of modular components may be four receiver electrical circuit channels being grouped together on a modular device constructed using a single piece of silicon, a single printed circuit board (PCB), or other construction similar to a single piece of silicon or single printed circuit board. The modular device may be used in optical communication modules that connect to optical fiber ribbon cables with four optical fibers and multiple instances of the device may be used in optical communication modules that connect to optical fiber ribbon cables with 8, 12, or 16 optical fibers. By using this modular device, individual devices with 8, 12, and 16 receiver electrical circuit channels do not have to be produced, resulting in a savings in the manufacturing process and/or research and development, and in some cases an increase in reliability.

Figure 3:
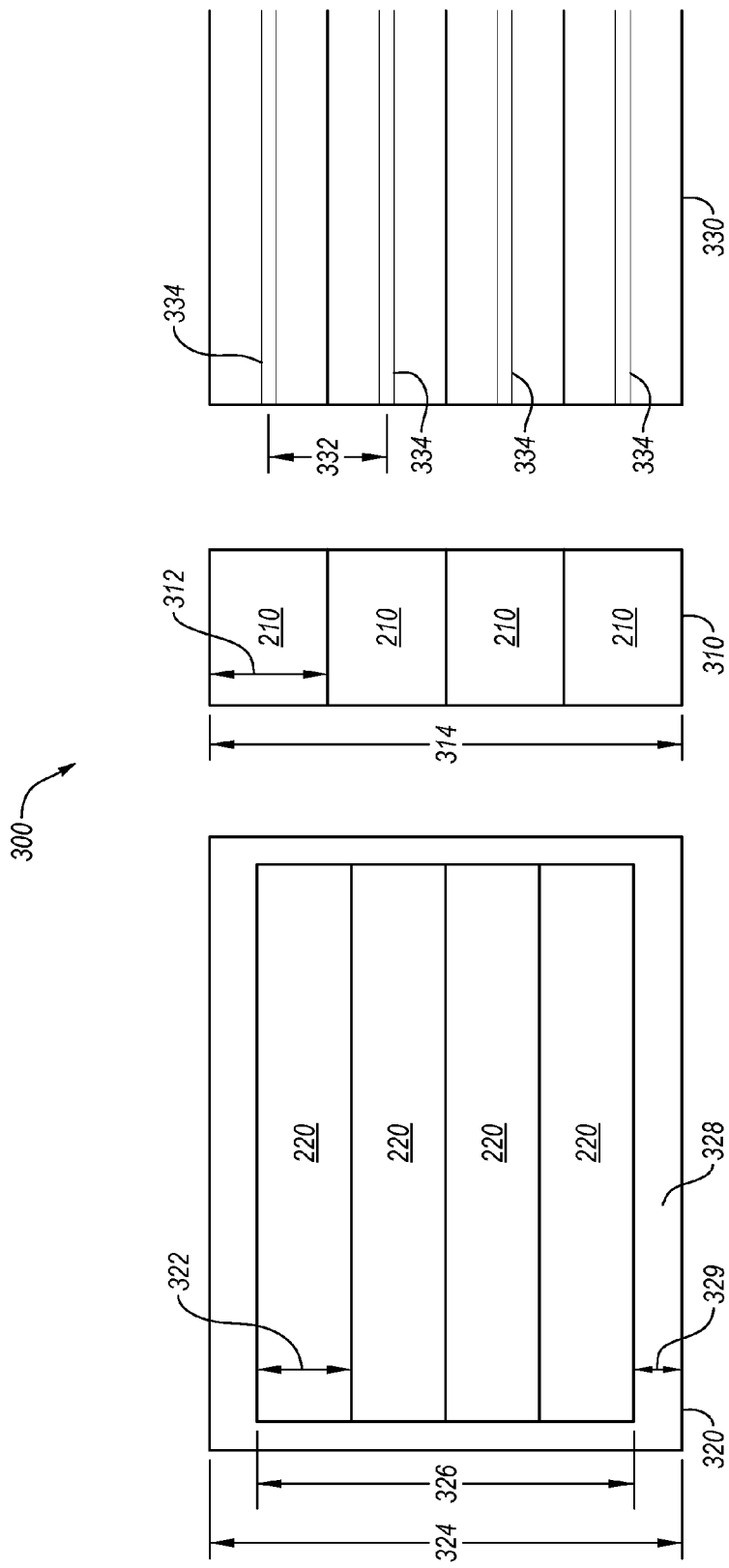
FIG. 3 illustrates an exploded view of various components within an optical communication module.
Figure 4:
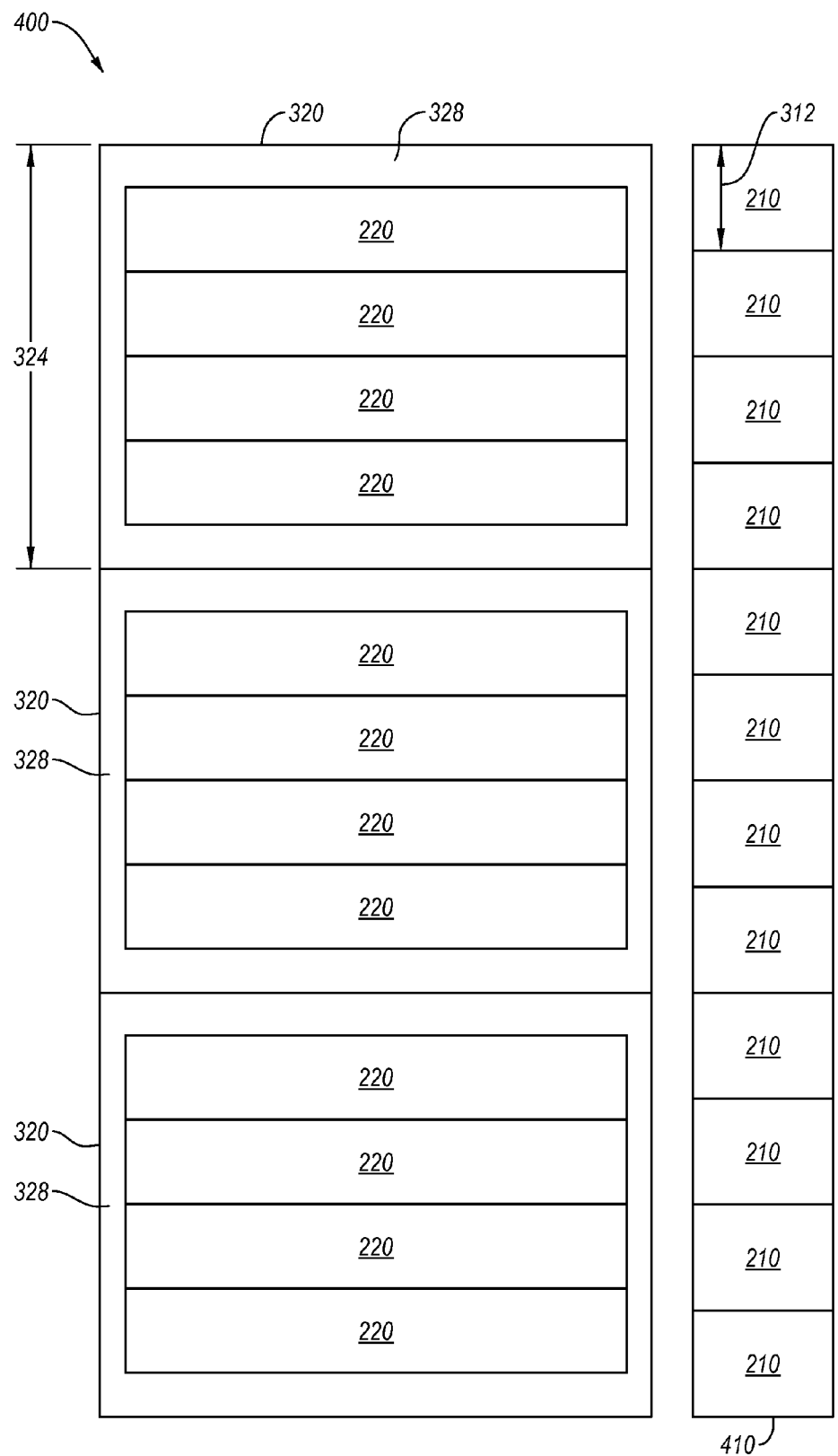
FIG. 4 illustrates an exploded view of various components within another optical communication module.

FIG. 3 illustrates a communication module with a modular device with four receiver electrical circuit channels. FIG. 4 illustrates a communication module with multiple instances of the modular device with four receiver electrical circuit channels as illustrated in FIG. 3. For simplicity, FIGS. 3 and 4 illustrate and the discussion regarding FIGS. 3 and 4 relates to optical communication modules with modular devices of multiple receiver electrical circuit channels with the understanding that other components in the optical communication modules may be modular. For example, in some embodiments, the optical communication modules may include modular devices of multiple transmitter electrical circuit channels. In some embodiments, the optical communication modules may include modular groups of multiple transmitter electrical circuit channels and multiple receiver electrical circuit channels. In some embodiments, the optical communication modules may include modular devices of multiple transmitter and receiving interface channels, or only modular devices of other types of channels.

In particular, FIG. 3 illustrates an exploded view of various components within an optical communication module 300, arranged in accordance with at least some embodiments described herein. The optical communication module 300 includes four receiver interface channels 210 arranged together as a receiver interface array 310 that may be configured as an opto-electrical interface. The optical communication module 300 further includes four receiver electrical circuit channels 220 arranged together as a receiver electrical circuit array 320. The receiver electrical circuit array 320 may be one example of a modular device as discussed herein. Because the receiver electrical circuit array 320 is modular and is a separate component that may be placed within the optical communication module 300, the receiver electrical circuit array 320 may include a seal 328 around the periphery of the receiver electrical circuit array 320. The seal 328 may be used to protect the receiver electrical circuit array 320 from moisture degradation or ionic contamination before and after the receiver electrical circuit array 320 is placed within the optical communication module 300.

FIG. 3 further illustrates an optical fiber ribbon cable 330. The optical fiber ribbon cable includes four optical fibers 334. The optical fibers 334 are spaced apart in the optical fiber ribbon cable 330 by an optical fiber spacing distance 332. In some embodiments, the optical fiber spacing distance 332 may be 250 micrometers. Each optical fiber 334 in the optical fiber ribbon cable 330 may be configured to be coupled to a single receiver interface channel 210. To couple the optical fibers 334 to the receiver interface channels 210, the optical fibers 334 may be aligned with the receiver interface channels 210. To align the receiver interface channels 210 with the optical fibers 334, the receiver interface channels 210 each has a channel width 312 that may be equal to or approximately equal to the optical fiber spacing distance 332. As a result, the receiver interface array 310 may have a total width 314 equal to or approximately equal to four times the channel width 312 of the receiver interface channels 210.

Each of the receiver interface channels 210 may also be configured to be coupled to a single receiver electrical circuit channel 220 of the receiver electrical circuit array 320. To couple the receiver electrical circuit channels 220 to the receiver interface channels 210, the receiver electrical circuit channels 220 may be aligned with the receiver interface channels 210.

For the receiver electrical circuit array 320 to be modular and used in an optical communication module in an embodiment as illustrated in FIG. 4, a width 324 of the receiver electrical circuit array 320 may be equal to, approximately equal to, or smaller than the total width 314 of the receiver interface array 310. To accomplish this, a channel width 322 of each of the receiver electrical circuit channels 220 may be smaller than the channel width 312 of each of the receiver interface channels 210 to compensate for a width 329 of the seal 328 around the receiver electrical circuit array 320. As a result, each receiver electrical circuit channel 220 may have a width less than the optical fiber spacing distance 332 of the optical fibers 334, and the total width 326 of the four receiver electrical circuit channels 220 may be less than the total width 314 of the four receiver interface channels 210.

In some embodiments, the four receiver interface channels 210 and the four receiver electrical circuit channels 220 may each be separate integrated circuits even though they are arranged together on the receiver interface array 310 and receiver electrical circuit array 320, respectively. Thus, in some embodiments, the four receiver interface channels 210, as separate integrated circuits, may sit on a single plane of silicon and the four receiver electrical circuit channels 220, as separate integrated circuits, may sit together on another single plane of silicon. Furthermore, in some embodiments, the four receiver interface channels 210 may each be located on individual dies that are placed next to each other to form the receiver interface array 310, and the four receiver electrical circuit channels 220 may each be located on individual dies that are placed next to each other to form the receiver electrical circuit array 320.

FIG. 4 illustrates an exploded view of various components within an optical communication module 400, arranged in accordance with at least some embodiments described herein. The communication module 400 includes twelve receiver interface channels 210 arranged together as a receiver interface array 410 that may be configured as an opto-electrical interface. The optical communication module 400 further includes three receiver electrical circuit arrays 320. The three receiver electrical circuit arrays 320 are placed side by side so that each of the receiver electrical circuit arrays 320 align to connect to four of the receiver interface channels 210 in the receiver interface array 410. If the receiver electrical circuit channels 220 in the receiver electrical circuit arrays 320 had a width equal to or approximately equal to the width of the receiver interface channels 210, the receiver electrical circuit channels 220 in one of the three receiver electrical circuit arrays 320 would align with the receiver interface channels 210 in the receiver interface array 410. The receiver electrical circuit channels 220 in the remaining two receiver electrical circuit arrays 320 would not align with the receiver interface channels 210 because of the seal 328 around the receiver electrical circuit arrays 320. By reducing the width of the individual receiver electrical circuit channels 220 in the receiver electrical circuit arrays 320 so that the total width of the receiver electrical circuit arrays 320 that includes the seal 328 and the receiver electrical circuit channels 220 is equal to or approximately equal to the channel width 312 of four receiver interface channels 210, all of the receiver electrical circuit channels 220 in the three receiver electrical circuit arrays 320 align with the receiver interface channels 210 in the receiver interface array 410.

The number of electrical circuit channels in a modular device, such as a receiver electrical circuit channel, may vary from those discussed or illustrated in FIGS. 3 and 4 and may include any number of channels. Alternately or additionally, the number of modular devices used for an optical communication module may depend on a number of electrical circuit channels in the modular devices and the number of interface channels in the optical communication module. The number of modular devices used in an optical communication module may be determined according to the following: $C=P/N$, where $C$ is the number of modular devices in the optical communication module, $P$ is the number of interface channels in an opto-electrical interface in the optical communication module, and $N$ is the number of electrical circuit channels in a modular device. For example, if $N=4$ and $P=16$, then $C=4$. As another example, if $N=2$ and $P=10$, then $C=5$. As other examples, when $N=4$, $C=2$ and $P=8$, $C=3$ and $P=12$, $C=4$ and $P=16$, among other combinations. To maintain alignment between electrical circuit channels and the interface channels in these various embodiments, the width of the modular devices including the seals of the modular device may equal or approximately equal the width of N number of interface channels, as previously explained.

In some embodiments, a modular device may include control circuitry for optimizing the performance of the modular device. The modular device may also include an interface bus, such as a serial peripheral interface bus, to allow communication to and from the control circuitry. In some embodiments, the interface buses of various modular devices in an optical communication module may be connected together in a daisy chain to communicate information between the modular devices. In this configuration, one of the modular devices may act as a master of the interconnected interface buses and the remaining modular devices may act as slaves.

The modular device acting as the master may be connected to a memory device and be able to access the memory device. The master modular device may also be able to communicate information to and from the memory device to the slave modular devices. The memory device may include information used by all of or some of the modular devices in an optical communication module during start-up and to optimize the performance of the electrical circuit channels within the modular devices. Alternately or additionally, the memory device may be used to store information about the modular devices. Alternately or additionally, the memory device may be used to store information generated by one or more of the modular devices.

Using the daisy chain configuration, a memory device for every modular device in an optical communication module may not be used. Furthermore, using the daisy chain configuration may reduce the number of leads involved with connecting each modular device to a memory device. Additionally, using a daisy chain configuration allows each modular device to have similar ports, which may facilitate the modular devices being modular.

In some embodiments, information regarding the location of each modular device within an optical communication module may be desirable. To allow each modular device to self-identify, each modular device may further include one or more bond pads that are held at a digital level of zero or at a digital level of one. The digital levels of the bond pads may be communicated to a controller to allow the controller to identify the location of each modular device in an optical communication module.

For example, with four modular devices connected together in an optical communication module, each modular device may include two bond pads. The first modular device may have both bond pads held at a digital level of zero. The second modular device may have a first bond pad held at a digital level of zero and a second bond pad held at a digital level of one. The third modular device may have a first bond pad held at a digital level of one and a second bond pad held at a digital level of zero. The fourth modular device may have both bond pads held at a digital level of one.

Figure 5:
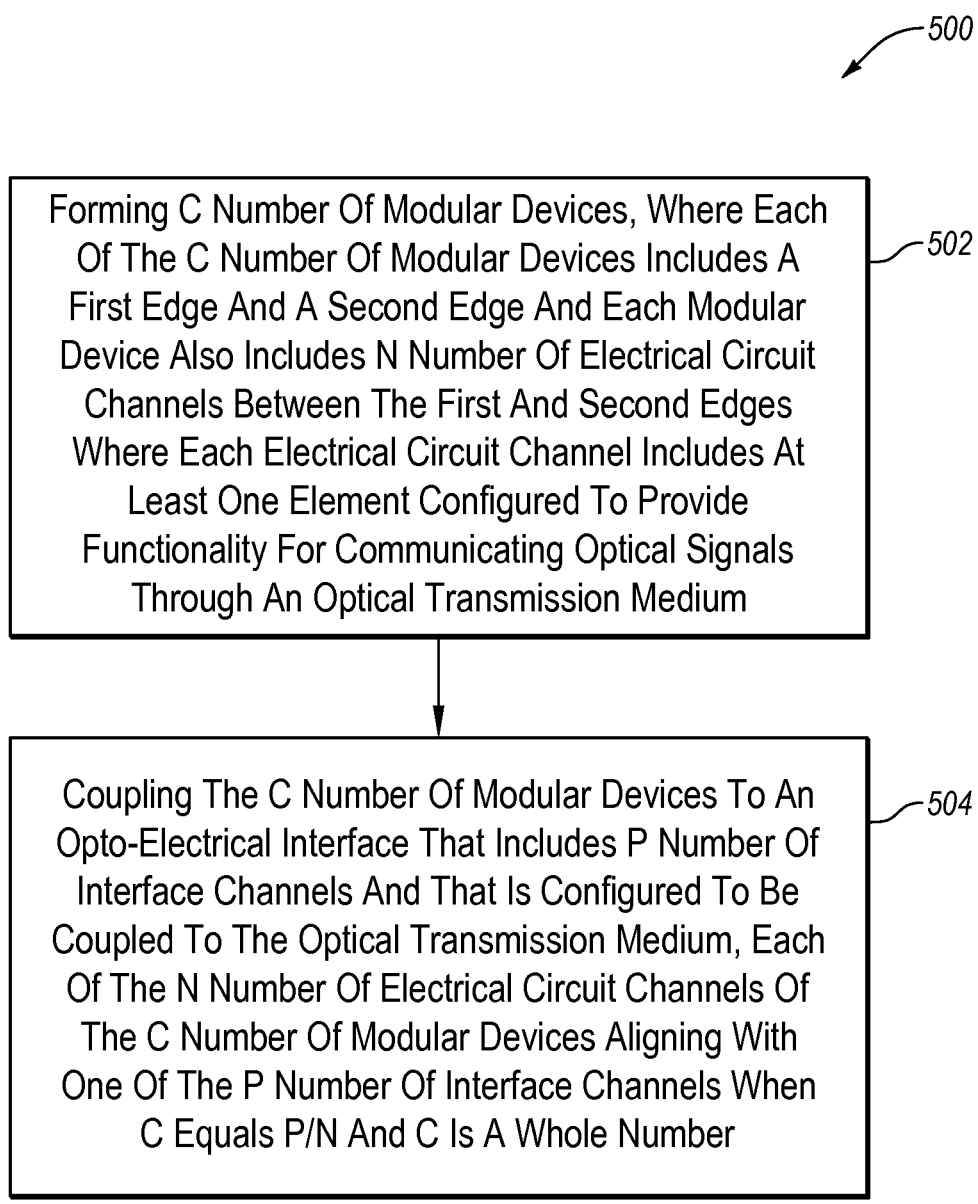
FIG. 5 is a flow chart of an example method of manufacturing an optical communication module that includes a modular device.

FIG. 5 is a flow chart of an example method 500 of manufacturing an optical communication module that includes a modular device, arranged in accordance with at least some embodiments described herein. Although the method 500 is illustrated as discrete blocks, various blocks may be divided into additional blocks, combined into fewer blocks, or eliminated, depending on the desired implementation.

The method 500 may begin at block 502, where C number of modular devices may be formed. Each of the C number of modular devices may include a first edge and a second edge. Each of the C number of modular devices may also include N number of electrical circuit channels between the first and second edges. Each electrical circuit channel may include at least one element configured to provide functionality for communicating optical signals through an optical transmission medium. In some embodiments, the modular device may include 2, 3, 4, 5, 6, or more electrical circuit channels.

In some embodiments, the electrical circuit channels may be configured to provide functionality for receiving optical signals. In these and other embodiments, the at least one element in the electrical circuit channels may include a transimpedance amplifier.

In some embodiments, the electrical circuit channels may be configured to provide functionality for transmitting optical signals. In these and other embodiments, the at least one element in the electrical circuit channels may include a laser driver, such as a VCSEL laser driver.

In block 504, the C number of modular devices may be coupled to an opto-electrical interface that includes P number of interface channels and that is configured to be coupled to the optical transmission medium. Each of the N number of electrical circuit channels of the C number of modular devices may align with one of the P number of interface channels when C equals P/N and C is a whole number.

In some embodiments, the optical transmission medium may be an optical cable ribbon. In some embodiments, the interface channels may include photodiodes. Alternately or additionally, the interface channels may include laser diodes, such as VCSEL laser diodes.

In some embodiments, when N=4, C may equal 2 and P may equal 8. Alternately, C may equal 3 and P may equal 12. Alternately, C may equal 4 and P may equal 16.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For instance, the method 500 may further include, for each of the C number of modular devices, forming a seal ring around the N number of electrical circuit channels. In some embodiments, the width of the modular device between the first and second edges with the N number of electrical circuit channels and the seal ring may be equal to or approximately equal to a width of the opto-electrical interface when P=N.

The method 500 may further include, when C is greater than 1, arranging the C number of modular devices so that the first edge of one of the C number of modular devices is next to the second edge of another of the C number of modular devices.

All examples and conditional language recited herein are intended for pedagogical objects to aid the reader in understanding the invention and the concepts contributed by the inventor to furthering the art, and are to be construed as being without limitation to such specifically-recited examples and conditions. Although embodiments of the present inventions have been described in detail, it should be understood that the various changes, substitutions, and alterations could be made hereto without departing from the spirit and scope of the invention.

What is claimed is:

1. A modular device for an optical communication module configured to be coupled to an optical transmission medium, the modular device comprising:
   a first edge and a second edge; and
   N number of electrical circuit channels between the first and second edges, each electrical circuit channel comprising at least one element configured to provide functionality for communicating optical signals through the optical transmission medium,
   wherein the modular device has a width between the first and second edges so that each of the N number of electrical circuit channels of C number of modular devices aligns with one of P number of interface channels of an opto-electrical interface configured to be coupled to the optical transmission medium when C equals P/N and C is a whole number greater than zero.

2. The device of claim 1, wherein if C is greater than 1, then the C number of modular devices are arranged with the first edge of one of the C number of modular devices next to the second edge of another of the C number of modular devices.

3. The device of claim 1, wherein each of the N number of electrical circuit channels has a width between the first and second edges that is less than a distance between the interface channels of the opto-electrical interface.

4. The device of claim 3, wherein the width of each of the N number of electrical circuit channels is less than 250 micrometers.

5. The device of claim 1, further comprising a seal ring around the periphery of the modular device, wherein the width of the modular device between the first and second edges with the N number of electrical circuit channels and the seal ring is approximately equal to a width of the opto-electrical interface when P=N.

6. The device of claim 1, wherein N=4, and C=2 and P=8, or C=3 and P=12, or C=4 and P=16.

7. The device of claim 1, wherein the at least one element in each of the N number of electrical circuit channels is configured to provide functionality for receiving optical signals.

8. The device of claim 7, wherein the at least one element in each of the N number of electrical circuit channels is a transimpedance amplifier.

9. The device of claim 8, wherein each transimpedance amplifier is configured to be coupled to an opto-electric transducer configured to receive optical signals.

10. The device of claim 1, wherein the at least one element in each of the N number of electrical circuit channels is configured to provide functionality for transmitting optical signals.

11. The device of claim 10, wherein the at least one element in each of the N number of circuit channels is a laser driver.

12. The device of claim 11, wherein each laser driver is configured to be coupled to a laser diode configured to transmit optical signals.

13. The device of claim 1, wherein the optical transmission medium is an optical fiber ribbon cable comprising a plurality of optical fibers.

14. A method of manufacturing an optical communication module comprising a modular device, the optical communication module configured to be coupled to an optical transmission medium, the method comprising:
- forming C number of modular devices, each of the C number of modular devices comprising a first edge and a second edge and comprising N number of electrical circuit channels between the first and second edges, each electrical circuit channel comprising at least one element configured to provide functionality for communicating optical signals through the optical transmission medium;
- coupling the C number of modular devices to an opto-electrical interface that comprises P number of interface channels and that is configured to be coupled to the optical transmission medium, each of the N number of electrical circuit channels of the C number of modular devices aligning with one of the P number of interface channels when C equals P/N and C is a whole number.

15. The method of claim 14, further comprising, for each of the C number of modular devices, forming a seal ring around the N number of electrical circuit channels.

16. The method of claim 15, wherein the width of the modular device between the first and second edges with the N number of electrical circuit channels and the seal ring is approximately equal to a width of the opto-electrical interface when P=N.

17. The method of claim 14, wherein N=4, and C=2 and P=8, or C=3 and P=12, or C=4 and P=16.

18. The method of claim 14, further comprising, when C is greater than 1, arranging the C number of modular devices so that the first edge of one of the C number of modular devices is next to the second edge of another of the C number of modular devices.

19. The method of claim 14, wherein each of the N number of electrical circuit channels has a width between the first and second edges that is less than a distance between the interface channels of the opto-electrical interface.

* * * * *